United States Patent
Engelke et al.

(10) Patent No.: US 12,304,243 B2
(45) Date of Patent: May 20, 2025

(54) WHEEL RIM ASSEMBLY

(71) Applicant: Ford Global Technologies, LLC, Dearborn, MI (US)

(72) Inventors: Julius Maximilian Engelke, Aachen (DE); Jessica Rebecca Rausch, Moenchengladback (DE); Abhinav Dhake, Aachen (DE); Niels Pasligh, Mönchengladback (DE)

(73) Assignee: Ford Global Technologies, LLC, Dearborn, MI (US)

( * ) Notice: Subject to any disclaimer, the term of this patent is extended or adjusted under 35 U.S.C. 154(b) by 636 days.

(21) Appl. No.: 17/536,642

(22) Filed: Nov. 29, 2021

(65) Prior Publication Data
US 2022/0169071 A1 Jun. 2, 2022

(30) Foreign Application Priority Data

Nov. 30, 2020 (DE) .......................... 102020215023.0

(51) Int. Cl.
*B60B 7/14* (2006.01)
(52) U.S. Cl.
CPC .......... *B60B 7/14* (2013.01); *B60B 2900/513* (2013.01)
(58) Field of Classification Search
CPC .. B60B 7/02; B60B 7/06; B60B 7/065; B60B 19/08; B60B 19/10
USPC .................................................... 301/6.3, 6.4
See application file for complete search history.

(56) References Cited

U.S. PATENT DOCUMENTS

| | | | | |
|---|---|---|---|---|
| 3,090,337 A | * | 5/1963 | Lyon | B60B 7/02 29/894.38 |
| 4,593,953 A | * | 6/1986 | Baba | B60B 7/0086 301/6.3 |
| 8,857,921 B2 | * | 10/2014 | Schmid | B60B 7/00 301/6.3 |
| 9,919,555 B2 | * | 3/2018 | Wippler | B60B 7/0086 |
| 2009/0195053 A1 | * | 8/2009 | Kruse | B60B 7/0053 301/6.4 |

FOREIGN PATENT DOCUMENTS

| | | |
|---|---|---|
| DE | 10161869 A1 | 7/2003 |
| DE | 102016003259 A1 | 8/2016 |
| DE | 102017007895 A1 | 3/2019 |

* cited by examiner

*Primary Examiner* — Jason R Bellinger
(74) *Attorney, Agent, or Firm* — Burr & Forman LLP; Lorne Forsythe

(57) ABSTRACT

A wheel cover assembly for a wheel of a motor vehicle may include a wheel body and a cover portion arranged on an outside of the wheel body. The cover portion may be guided on the wheel body so as to be movable relative to the wheel body between an open position allowing an air flow between the outside and an inside of the wheel body, and a closed position preventing the air flow. Conversion from the open position to the closed position takes place automatically based on an operating state of the wheel. The cover portion may be configured as a disc-like component covering the outside. The cover portion may be arranged movably parallel to an axis of the wheel body between the open position and the closed position, in the open position opening a ring gap between an edge of the cover portion and the wheel body.

7 Claims, 4 Drawing Sheets

WHEEL RIM ASSEMBLY

TECHNICAL FIELD

Example embodiments generally relate to motor vehicles and more particularly relate to a wheel cover of a motor vehicle.

BACKGROUND

The structural design of the cover assembly as part of the wheel assembly of a motor vehicle must take into account, amongst other factors, the cooling of a brake system, the speed-dependent aerodynamic resistance, and an aesthetic effect of the external appearance. Cooling of the brake system with the aim of preventing an excessive rise in temperature during times of high braking performance is necessary in order to even out the available braking effect. The aerodynamic resistance is taken into account with the aim of reducing energy consumption and the associated $CO_2$ emissions, desirable for environmental policy reasons.

To take account of these criteria, various possible solutions are known which however only often consider partial aspects.

A cover portion is known for example from DE 10 2016 003 259 A1. This is characterized by an arrangement of cover parts which are arranged so as to be movable in the peripheral direction between a position closing an arrangement of passage openings in the wheel body and a position opening these, i.e. for axial through-flow. The drive for this movement of the cover parts is a centrifugal mechanism in which a peripheral force can be exerted on each of the cover parts via a lever, the mounting point of which is held so as to be radially displaceable under spring force in a specific radial deflection. Under the centrifugal force, accordingly a greater or lesser deflection of the cover part takes place, opening a corresponding part of the assigned passage opening for through-flow. Alternatively, the cover parts may be combined into a disc-like covering element which is arranged as a structural unit so as to be movable in the peripheral direction by means of said centrifugal mechanism; in each case, the solution for the structural design of the speed-dependent movement of the cover element or cover parts is comparatively complex. In addition, the aspect of aerodynamics of the vehicle wheel equipped with such a cover has not been taken into account.

BRIEF SUMMARY OF SOME EXAMPLES

Some example embodiments may provide a wheel cover assembly for a wheel of a motor vehicle. The wheel cover assembly may include a wheel body and a cover portion arranged on an outside of the wheel body. The cover portion may be guided on the wheel body so as to be movable relative to the wheel body between an open position allowing an air flow between the outside and an inside of the wheel body, and a closed position preventing the air flow. Conversion from the open position to the closed position takes place automatically based on an operating state of the wheel. The cover portion may be configured as a disc-like component covering the outside. The cover portion may be arranged movably parallel to an axis of the wheel body between the open position and the closed position, in the open position opening a ring gap between an edge of the cover portion and the wheel body.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
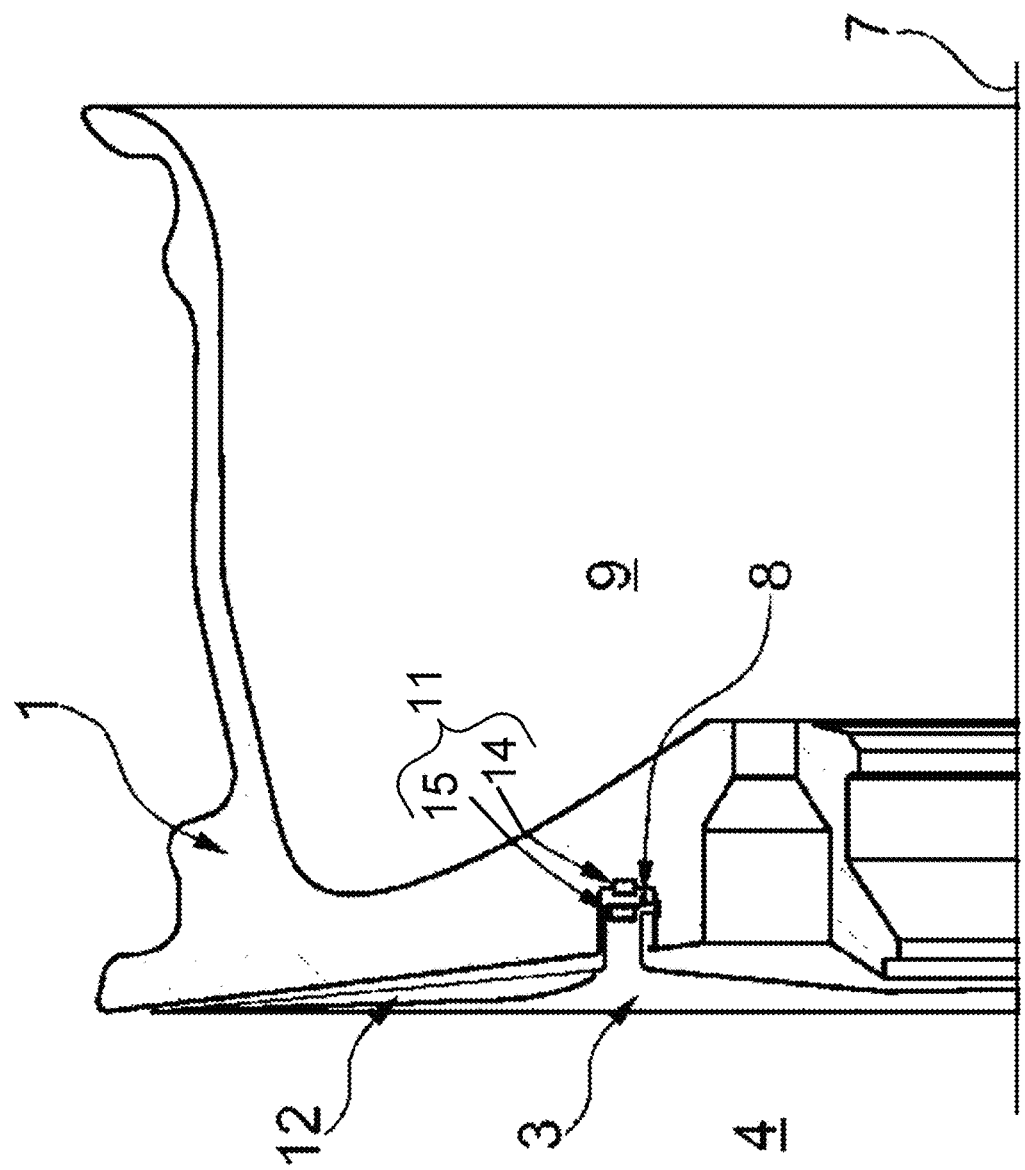
FIG. 1 shows the closed state of a wheel cover assembly of a wheel in partial illustration and in an axial cross-section according of an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other. It should be noted that the features and measures presented individually in the following description can be combined in any technically feasible manner, giving rise to further embodiments of the invention. The description additionally characterizes and specifies aspects of some example embodiments, particularly in conjunction with the figures.

FIG. 1 shows a partial illustration of a wheel 1 of a vehicle, the dish portion 2 of which is configured in the known manner for mounting on a wheel carrier via a hub portion (not shown in the drawing).

A cover portion 3 is arranged on the outside 4 of the wheel 1, completely covering the vehicle wheel and giving the vehicle wheel favorable aerodynamic properties in the position shown in FIG. 1, in particular avoiding turbulence at high speeds. The cover portion 3 may be described as a wheel cap, but in principle the cover portion 3 is captively connected to the wheel 1. As can be appreciated from FIG. 1, the cover portion 3 is removable from the wheel 1, for example for inspection purposes or repair purposes.

On a side of the cover portion 3 that faces the wheel 1, the cover portion 3 carries a ring web 5, which is received in a ring groove 6 of the dish portion 2 and serves for mounting and guidance on the dish portion 2. The ring groove 6 is spaced from the wheel 1 in the radial direction viewed onto the axis 7, i.e. its rotational axis, i.e. effectively offset towards the outside. Correspondingly, the ring web 5 is arranged on the cover portion 3. The direct contacting inside the ring groove 6 takes place via a helical or thread-style structure 8, such that depending on a relative movement of the cover portion 3 relative to the dish portion 2, a shift of the cover portion along the axis 7 is triggered. This structural design of the engagement of the ring web 5 with the ring groove 6 for implementing this force-guided movement of the cover portion 3 relative to the wheel 1 is arbitrary in itself and can be achieved with any means known to the person skilled in the art.

FIG. 1 also shows the cover portion 3 of the wheel cover assembly in a closed position, in which the space on the inside 9 of the wheel 1 is closed against the outside 4.

Figure 2:
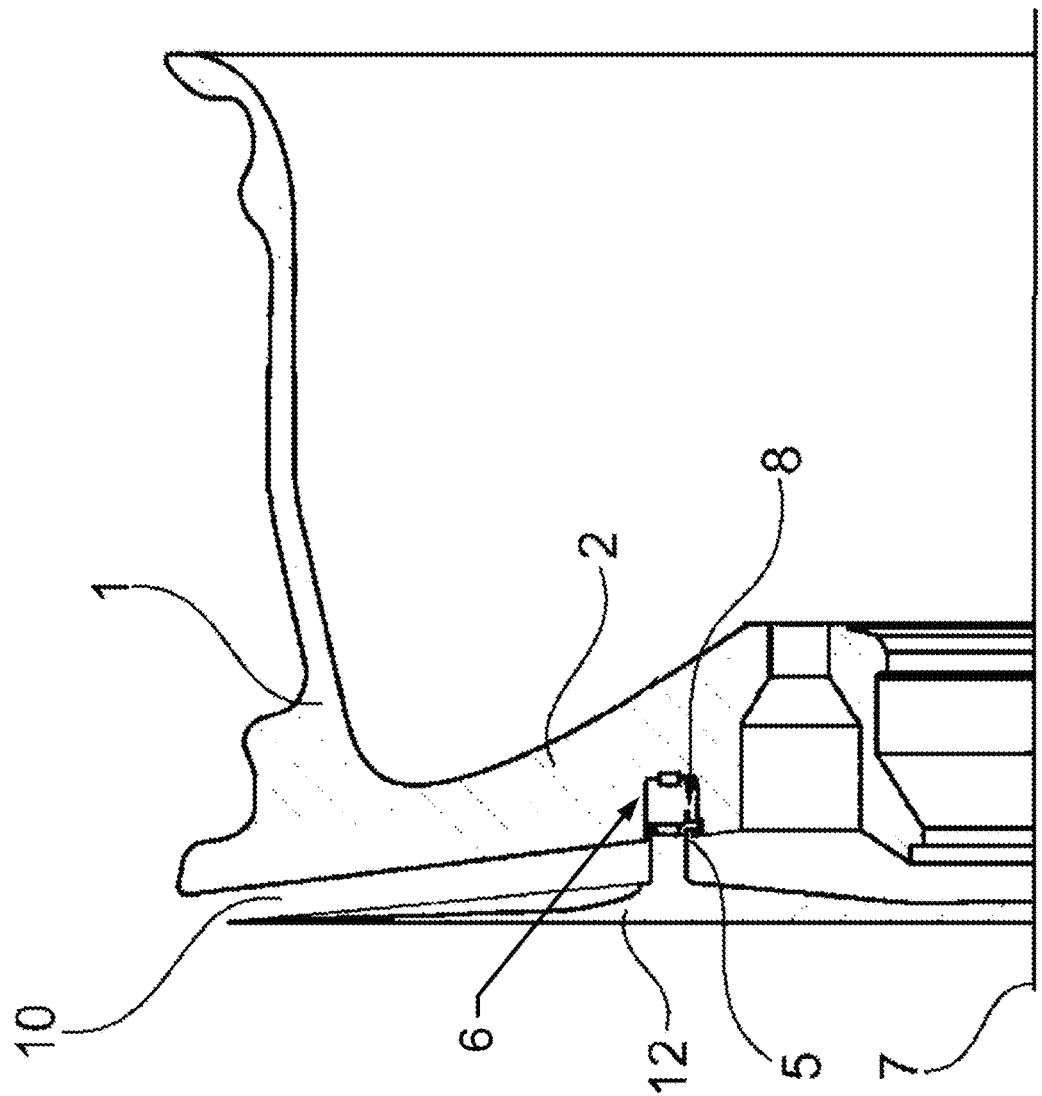
FIG. 2 illustrates the wheel cover assembly of FIG. 1 in an open state according to of an example embodiment.

In the open position, shown in FIG. 2, because of the relative rotation of the cover portion 3 relative to the wheel 1 by an angular element, a ring gap 10 may be formed between the cover portion 3 and the wheel 1, through which heat can be dissipated via a cooling air stream which is in thermal contact in particular with parts of a brake system and is caused by pressure differences between the inside 9 and the outside 4, depending amongst other factors on the respective travel speed.

Correspondingly to the said angular element which defines the rotational angle between the closed position shown in FIG. 1 and the open position of the cover portion 3 shown in FIG. 2, two positions of the cover portion 3 are established which are secured by magnetic bodies 11, of which in each of the positions a respective one is arranged on the dish portion 2, namely inside the ring groove 6, and one cooperating therewith on the ring web 5. The magnetic bodies 11 serve to secure the two positions against undesired, unintentional changes.

To support an air circulation, the inside of the cover portion 3 may be equipped with vanes 12 which may alternatively also be provided on the side of the dish part 2 facing the cover portion 3. A possible form of such vanes 12 is indicated schematically in FIG. 3.

Figure 3:
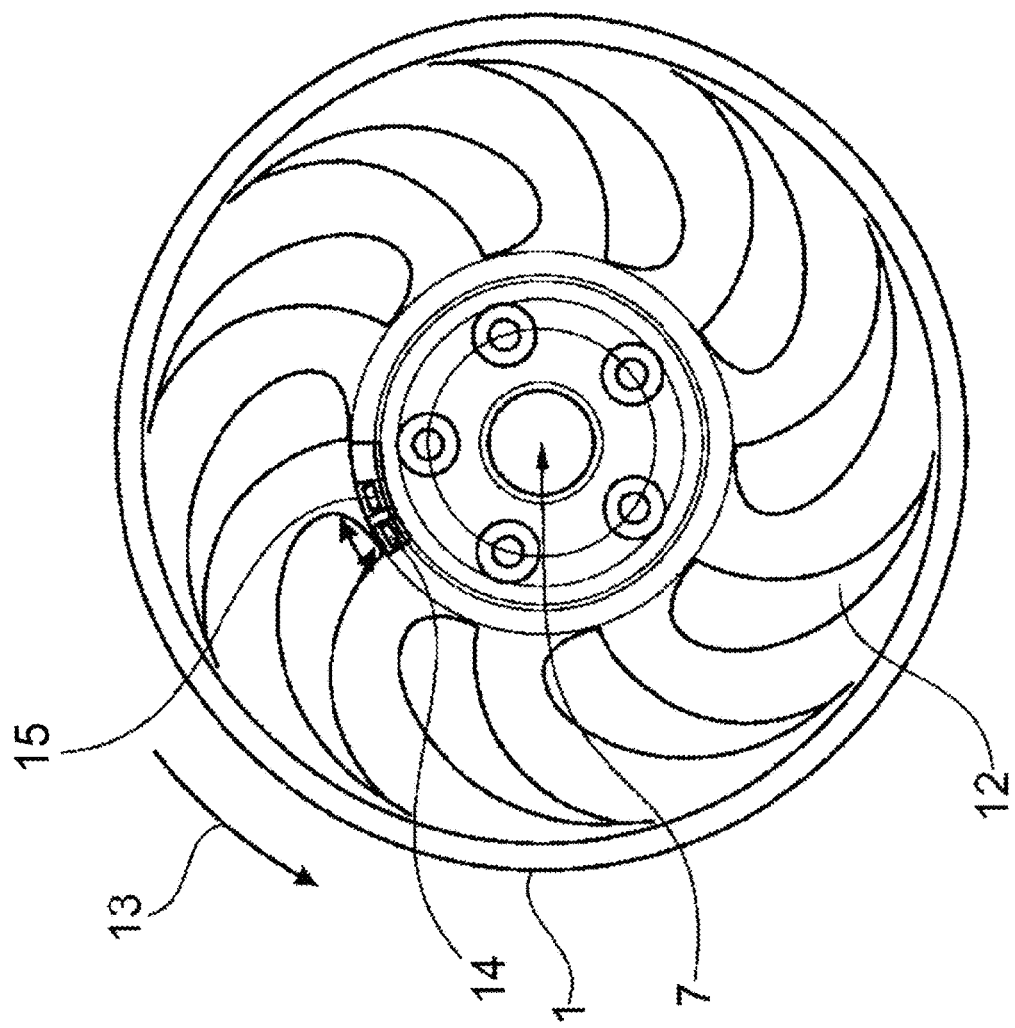
FIG. 3 is a schematic, front view of the wheel cover assembly of FIG. 1 according to an example embodiment.

In the exemplary embodiment shown in FIG. 3, the vanes 12 take the form of the profile, for example a type of wing profile which may also be designed curved on its profile edges. The cover portion 3 may also have as vanes 12 radially linearly running webs which extend from a middle region of the cover portion to its outer edge.

For a vehicle wheel which is equipped with a wheel cover assembly designed in the manner described above, a demand-driven cooling effect in the area of the brake system can easily be achieved, wherein simultaneously an economic vehicle operation is ensured because of the closed state of the wheel.

At a minimum level of acceleration of the vehicle, relative rotational movements of the cover portion 3 occur relative to the wheel 1; since no carrier effect is exerted by the wheel 1 on the cover portion 3, due to inertia the latter executes a rotation relative to the wheel 1 according to the direction of acceleration and accordingly triggers the open position or closed position.

Stable operation is ensured in that, to change the position of the cover portion 3, a minimum level of acceleration must be present in order to overcome the retaining force of the magnetic bodies 11 and move the cover portion 3 between said positions in the one or other direction. Because of the magnetic fixing in said positions, at the same time it is ensured that small vibrations or slight changes in acceleration cannot themselves trigger changes in the position of the cover portion 3.

The arrangement of the magnetic bodies 11 and the forces to be generated are adapted to the peripheral conditions described initially.

FIG. 3 shows the position of two magnetic bodies 14, 15 on a wheel 1 rotating around the axis 7 in the direction of the arrow 13. Reference sign 14 designates a magnetic body connected to the wheel 1, whereas 15 designates a magnetic body connected to the cover portion 3.

On an inside of the cover portion 3, i.e. on the side facing the outside 4 of the wheel 1, the cover portion 3 may also have a contact element. The contact element may be arranged on the outer end of the cover portion 3. The contact element may include a soft flexible material so as to avoid a hard contact on the wheel 1, whereby damage e.g. scratches to the wheel 1, i.e. its outside 4, are avoided, which is desirable in particular in the case of alloy wheels. The contact element may also have a sealing function when this cover portion 3 is arranged in its closed position. The contact element may also prevent disruptive rattling noises when the cover portion 3 rests completely on the wheel in its closed position. The dimensions of the contact element may be designed so as to prevent undesirable air turbulence and not significantly affect the dimensions of the ring gap 10.

As can be appreciated from the descriptions above, the cover portion 3 may suitably be designed, i.e. in its stiffness, such that in the open position, the action of travel wind does not cause fluttering of the cover element, wherein the cover portion 3 is effectively stabilized.

Figure 4:
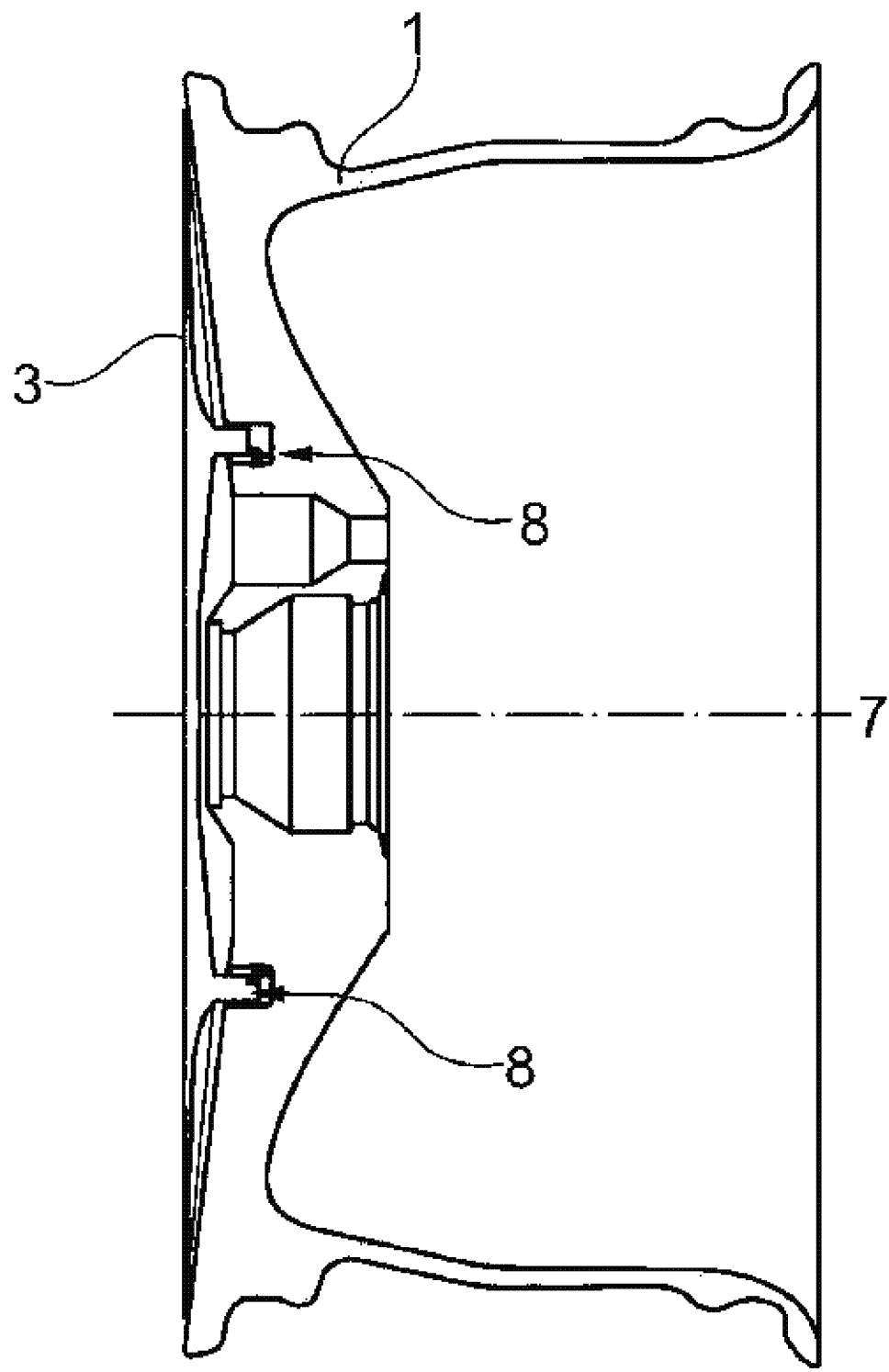
FIG. 4 illustrates a wheel cover assembly according to another example embodiment.

In an example embodiment, it may also be provided that several thread-like structures 8 are provided which are offset in the circumferential direction and have correspondingly designed magnetic bodies 11. FIG. 4 shows as an example that two thread-like structures 8 are provided which are arranged diametrically opposite one another with respect to the rotational axis 7. However, three or more structures 8, i.e. ring webs 5 and ring grooves 6, may also be provided, each with cooperating magnetic bodies. The plurality of thread-like structures 8 may be evenly distributed in the circumferential direction. Such a high number of thread-like structures 8 admittedly initially appears disadvantageous. However, the thread-like structures 8 can easily be produced quickly with modern production methods, with high efficiency and without significant complexity, e.g. in a casting process of the wheel (alloy) and cover portion (plastic), in particular in mass production. Also, the advantages prevail with respect to stabilizing the cover portion 3 against the effect of travel wind in the open position, but also with respect to the more ideal design of the magnetic bodies which can each be designed independently and adapted to the others with respect to the level of acceleration required to be triggered, i.e. they can be dimensioned smaller and hence lighter in comparison with a single thread-like structure 8, such that only when the retaining forces of the magnetic bodies are overcome can a transfer take place from the closed position to the open position and vice versa. Suitably, a magnetic body 11 may also be provided in each of the respective end positions of the ring groove 6 of the dish portion 2 in order to secure the opening and/or closed position. Thus only one magnetic body 11 need be provided on the cover portion 3.

Accordingly, a wheel cover assembly for a wheel of a motor vehicle may be provided. The wheel cover assembly may include a wheel and a cover portion arranged on an outside of the wheel. The cover portion may be guided on the wheel so as to be movable relative to the wheel between an open position allowing an air flow between the outside and an inside of the wheel, and a closed position preventing the air flow. Conversion from the open position to the closed position takes place automatically based on an operating state of the wheel. The cover portion may be configured as a disc-like component covering the outside. The cover portion may be arranged movably parallel to an axis of the wheel between the open position and the closed position, in the open position opening a ring gap between an edge of the cover portion and the wheel.

The wheel cover assembly of some embodiments may include additional features, modifications, augmentations and/or the like to achieve further objectives or enhance performance of the system. The additional features, modifications, augmentations and/or the like may be added in any combination with each other. Below is a list of various additional features, modifications, and augmentations that can each be added individually or in any combination with each other. For example, the cover portion may be arranged so as to be freely rotatable about the axis relative to the wheel. In an example embodiment, the cover portion may be configured as a component having a smooth surface region, and closed on a side facing the outside. In some cases, the cover portion may be mounted on the wheel via a ring web, the ring web being in engagement with a ring groove of the wheel. Axes of the ring web and the ring groove may extend parallel to the axis of the wheel. In an example embodiment, the assembly may further include means for connecting a movement of the cover portion in a direction parallel to the axis to a rotational movement about the axis in the manner of a forced guidance. In some cases, the means for connecting may be formed by a thread-style guidance of the ring web inside the ring groove. In an example embodiment, a rotational movement of the cover portion about the axis may be limited in rotational angle according to a design of the ring gap. In some cases, end points of the rotational movement, limited in rotational angle, are secured by magnetic bodies.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A wheel cover assembly for a wheel of a motor vehicle, the wheel cover assembly comprising:
   a wheel body; and
   a cover portion arranged on an outside of the wheel body,
   wherein the cover portion is operably coupled to the wheel body so as to be movable relative to the wheel body between an open position allowing an air flow between the outside and an inside of the wheel body, and a closed position preventing the air flow,
   wherein conversion from the open position to the closed position takes place automatically based on an operating state of the wheel,
   wherein the cover portion is configured as a disc-like component covering the outside,
   wherein the cover portion is movable axially along an axis of rotation of the wheel body between the open position and the closed position,
   wherein in the open position, a ring gap is formed between an edge of the cover portion and the wheel body, and
   wherein the cover portion rotates about the axis of rotation of the wheel body to move axially between the open position, in which the cover portion is disposed away from the wheel body, and the closed position, in which the cover portion is disposed proximate to the wheel body.

2. The wheel cover assembly according to claim 1, wherein the cover portion is arranged so as to be freely rotatable about the axis of rotation relative to the wheel body.

3. The wheel cover assembly according to claim 1, wherein the cover portion is configured as a component having a planar surface region, and closed on a side facing the outside.

4. The wheel cover assembly according to claim 1, wherein the cover portion is mounted on the wheel body by a ring web of the cover portion being in engagement with a ring groove of the wheel body,
   wherein the ring web and the ring groove extend around the axis of rotation of the wheel body, and
   wherein the axis of rotation of the wheel body extends through a center of the ring web and the ring groove.

5. The wheel cover assembly according to claim 4, further comprising means for connecting a movement of the cover portion in a direction parallel to the axis of rotation to a rotational movement about the axis of rotation.

6. The wheel cover assembly according to claim 1, wherein a rotational movement of the cover portion about the axis of rotation is limited in rotational angle according to a design of the ring gap.

7. A wheel cover assembly for a wheel of a motor vehicle, the wheel cover assembly comprising:
   a wheel body; and
   a cover portion arranged on an outside of the wheel body,
   wherein the cover portion is guided on the wheel body so as to be movable relative to the wheel body between an open position allowing an air flow between the outside and an inside of the wheel body, and a closed position preventing the air flow,
   wherein conversion from the open position to the closed position takes place automatically based on an operating state of the wheel,
   wherein the cover portion is configured as a disc-like component covering the outside, the cover portion is movable axially along an axis of rotation of the wheel body between the open position and the closed position, in the open position opening a ring gap between an edge of the cover portion and the wheel body,
   wherein a rotational movement of the cover portion about the axis of rotation is limited in rotational angle according to a design of the ring gap, and
   wherein end points of the rotational movement, limited in rotational angle, are secured by magnetic bodies.

* * * * *